United States Patent Office 3,038,878
Patented June 12, 1962

3,038,878
HEAT-STABLE POLY-α-OLEFIN COMPOSITIONS
Alan Bell, M B Knowles, and Clarence E. Tholstrup, Kingsport, Tenn., assignors to Eastman Kodak Company, Rochester, N.Y., a corporation of New Jersey
No Drawing. Filed July 29, 1960, Ser. No. 46,056
12 Claims. (Cl. 260—45.85)

This invention relates to new poly-α-olefin compositions. Preferred embodiments of the invention relate to polyethylene and polypropylene compositions having enhanced stability at elevated temperatures to oxidative degradation and the preparation thereof.

Poly-α-olefins such as polyethylene, polypropylene and the like are commonly subjected to elevated temperatures in the course of their processing into useful items of commerce. Such processing methods as rolling, injection molding, extrusion and the like at elevated temperatures usually result in oxidative degradation of the polymer. In addition, many uses of poly-α-olefins, such as in electrical insulation and the like, oftentimes expose the poly-α-olefin to elevated temperatures. To minimize oxidative deterioration in poly-α-olefins, anti-oxidants or stabilizers are oftentimes incorporated therein.

It is an object of this invention to provide new poly-α-olefin compositions having enhanced resistance to thermal degradation and which are useful for a wide variety of purposes including surprising utility as food packaging materials.

It is another object of this invention to provide new synergistic combinations of stabilizers for poly-α-olefin compositions.

It is also an object of this invention to provide novel polyethylene and polypropylene compositions containing synergistic combinations of compounds that impart considerably enhanced stability to the polyethylene and polypropylene compositions against deterioration resulting from exposure to elevated temperatures.

Other objects of the invention will be apparent from the description and claims that follow.

The present invention comprises poly-α-olefin compositions having incorporated therein a stabilizer combination of a diester of 3,3'-thiodipropionic acid and an alkylenedioxybis(alkylated)phenol.

The diesters of 3,3'-thiodipropionic acid comprising the present stabilizer combination have the following formula:

wherein R is an alkyl radical having at least four carbon atoms and preferably 8 to about 20 carbon atoms. Particularly effective esters are dilauryl-3,3'-thiodipropionate, distearyl-3,3'-thiodipropionate, and others having a similar range of carbon atoms. Other effective esters include dibutyl-3,3'-thiodipropionate, etc. However, any diester of 3,3'-thiodipropionic acid as described above can be employed in the present stabilizer combination including the butyl, amyl, hexyl, heptyl, octyl, nonyl, decyl, tridecyl, myristyl, pentadecyl, cetyl, heptadecyl, stearyl, and eicosyl diesters of 3,3'-thiodipropionic acid, or mixtures thereof.

The alkylenedioxybis(alkylated phenols) which can be effectively used in combination with the described diesters of 3,3'-thiodipropionic acid have the following general formula:

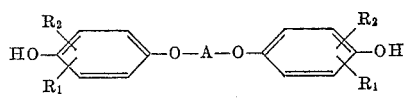

wherein each of $R_1$ and $R_2$ represents a member selected from the group consisting of a hydrogen atom and an alkyl-organic radical containing from 1 to 18 carbon atoms, said alkyl-organic radical encompassing cycloalkyl, alkenyl, and aralkyl radicals, and A represents an alkylene radical containing from 2 to 20 carbon atoms. Advantageously, A represents an alkylene radical selected from the group consisting of ethylene, tetramethylene, decamethylene, octadecamethylene, and 3-methylhexamethylene. $R_2$ can be the same as $R_1$, or it can be a different organic radical or a hydrogen atom. Either or both of $R_1$ and $R_2$ quite advantageously represent a tertiary alkyl radical. Each of the four substituents represented by $R_1$ and $R_2$ can be different, although it is generally advantageous if the two $R_1$ substituents are identical and the two $R_2$ substituents are the same as the two $R_1$ substituents or that they represent hydrogen atoms.

The alkylenedioxybis(alkylated phenols) used in this invention in poly-α-olefins in combination with diesters of 3,3'-thiodipropionic acid can be prepared in accordance with the procedure illustrated by the examples included in our copending application, Serial No. 702,814, filed December 16, 1957, now U.S. Patent No. 2,967,774, which contains certain subject matter common herewith. Representative of these phenols are 4,4'-ethylenedioxybis(2-tert-butylphenol), 4,4'-ethylenedioxybis[2-(1,1,3,3-tetramethylbutyl)phenol], 4,4'-tetramethylenedioxybis(2-tert-butylphenol and 4,4'-decamethylenedioxybis(2-tert-butylphenol), although other compounds coming within the scope of the above formula for the alkylenedioxybis(alkylated phenols) used in this invention also give good results when used together with diesters of thiodipropionic acid as heat stabilizers for poly-α-olefins.

The combination of the described diesters of 3,3'-thiodipropionic acid and the alkylene dioxybis(alkylated phenols) can be used to stabilize a wide variety of solid poly-α-olefin compositions against deterioration resulting from exposure to elevated temperatures. Any of the normally solid polymers of α-monoolefinic aliphatic hydrocarbons containing 2 to 10 carbon atoms can be stabilized in accordance with the invention. The subject stabilizer combinations are preferably used in polyethylene and polypropylene, especially polypropylene, although such poly-α-olefins as poly(3-methylbutene-1), poly(4-methylpentene-1), poly(pentene-1), poly(3,3-dimethylbutene-1), poly(4,4-dimethylbutene-1), poly(octene-1), poly(decene-1), and the like can also be stabilized with the subject stabilizer combinations. Both the so-called "low density" and "high density" or high crystallinity poly-α-olefin compositions can be stabilized in accordance with the invention. Reference is made to Fawcett et al. U.S. Patent No. 2,153,553, granted April 11, 1939, and to copending application Coover et al. U.S. Serial No. 724,904, now abandoned, filed March 31, 1958, with regard to the preparation of various illustrative poly-α-olefin compositions that can be stabilized against thermal degradation in accordance with the invention. The additive stabilizer combinations of the invention are especially useful for stabilizing the solid resinous poly-α-olefins having average molecular weights of at least 15,000 and more usually at least 20,000, although the stabilizer combinations o f the invention can also be utilized to stabilize the so-called poly-α-olefin waxes having lower average molecular weights of usually 3,000 to 12,000. Upper molecular weight limits do not exist since cross-linking and high degrees of polymerization produce molecular weights of several hundreds of thousands or higher.

The amount of the combination of the diester of 3,3'-thiodipropionic acid and the alkylene dioxybis(alkylated phenol) employed in poly-α-olefin composition in accordance with the invention can be widely varied, the stabilizing amount of this combination usually varying with the particular use to which the poly-α-olefin compositions are to be put. Concentrations of at least about 0.0005% of each stabilizer component are suitable, although up to about 5% or more of each component can be used; about 0.005% to 2% of each component is generally preferred, the concentration being based on the weight of the poly-α-olefin. It is generally advantageous to utilize the combination of the subject stabilizers at a weight ratio of the diester of 3,3′-thiodipropionic acid to the alkylene dioxybis(alkylated phenol) in the range of 1/20 to 20/1 and preferably 1/5 to 5/1; of course, higher or lower ratios can be employed.

The stabilizer combinations of the invention can be incorporated or blended into poly-α-olefin compositions by the conventional methods utilized for blending such materials into resins or plastics. Typical of such methods that can be suitably employed include milling on heated rolls, deposition from solvents, and dry blending. The stabilizers of the invention can be incorporated separately or together into the poly-α-olefin compositions.

The stabilizer combinations of the present invention lend to poly-α-olefin compositions enhanced stability, and more particularly, enhanced stability against oxidative deterioration resulting from exposure to elevated temperatures. In addition, poly-α-olefin compositions containing the stabilizer combinations of the invention have enhanced stability against deterioration resulting from exposure to sunlight or ultraviolet light. Thus, poly-α-olefins stabilized in accordance with the invention have an extended life expectancy and can be used more effectively than unstabilized poly-α-olefins for a wide diversity of uses. Poly-α-olefins stabilized as described can be cast, extruded, rolled or molded into sheets, rods, tubes, pipes, filaments and other shaped articles, including the widely used films of the polymers about 0.5 to 100 mils in thickness. The present compositions can be used for coating paper, wire, metal foil, glass fiber fabrics, synthetic and natural textiles or fabrics, and other such materials. Such materials in the form of sheets, films or coatings are surprisingly valuable as food wrapping materials since they enhance the stability of a variety of packaged foods. Such wrapping materials may also contain other food grade stabilizer compounds.

The subject stabilizer combinations of dialkyl esters of 3,3′-thiodipropionic acid and alkylene dioxybis(alkylated phenols) are synergistic combinations, namely, the stabilizing effect of such combinations in poly-α-olefins is substantially greater than the additive effect of the individual stabilizers of the combination.

The invention is illustrated by the following examples of preferred embodiments thereof which are not intended to be unduly limiting. In the following examples the stability of the poly-α-olefins was determined by an oven storage test. The poly-α-olefin under investigation is compression molded into a smooth sheet or plate. The plate is then cut into pieces weighing about 0.25 g. each. The 0.25 g. samples of the molded polymer are then placed in an air oven at 160° C. Samples are removed at intervals and each sample analyzed for peroxides. The oven storage life is the time required for initial peroxide formation in a sample of the polymer. To determine peroxide formation in the oven exposed samples, each 0.25 g. sample in question is dissolved or suspended in 20 ml. of carbon tetrachloride and allowed to digest for 25 minutes. To this is added 20 ml. of a mixture consisting of 60% glacial acetic acid and 40% chloroform, and then 1.0 ml. of a saturated aqueous solution of potassium iodide. The resulting mixture is allowed to react for two minutes, 100 ml. of water is added to dilute the mixture, and then a starch indicator is added. The resulting mixture is then back-titrated with 0.002 N sodium thiosulfate. The peroxide concentration, P, in milliequivalents per kilogram of polymer is given by the expression $P = 8S$, where $S$ is the number of milliliters of 0.002 N sodium thiosulfate used.

EXAMPLE 1

Several samples of powdered polypropylene were mixed by dry blending with dialkyl-3,3′-thiodipropionates and an alkylenedioxybis(alkylated phenol) covered by the invention, compression molded into plates 1/16 inch in thickness, and the resulting molded samples evaluated with respect to stability by the 160° C. oven storage test described above. The polypropylene was a plastic-grade solid polypropylene having an average molecular weight greater than 15,000, a density of about 0.91 and an inherent viscosity of about 1.48 as determined in tetralin at 145° C.

The results of the stability evaluations are summarized by the data set out in Table A below. Samples of the individual components of the various stabilizer combinations in the polypropylene, as well as the polypropylene with no additive were included in the stability tests for comparative purposes. Also, samples having incorporated therein other phenols not coming within the scope of the above formula for the alkylenedioxybis (alkylated phenols) used in this invention in combination with a representative dialkyl-3,3′-thiopropionate were included to demonstrate the unexpected superiority of the alkylenedioxybis (alkylated phenols) in synergistic combination with dialkyl-3,3′-thiodipropionates in poly-α-olefins.

Measurements of the 140° C. stress cracking resistance (hours) were also made on representative samples to show the outstanding and unobvious results obtained by the use of the synergistic combination of this invention. The concentrations of additives in Table A are based on the weight of the polypropylene.

In Table A "DBTDP" is di-n-butyl-3,3′-thiodipropionate, "DLTDP" is dilauryl-3,3′-thiodipropionate, and "DSTDP" is distearyl-3,3′-thiodipropionate.

*Table A*

| Additives in Polypropylene | Oven Life at 160° C., Hours | 140° C. Stress Cracking Resistance, Hours |
|---|---|---|
| 1. None | 0.2 | 10 |
| 2. 0.1% DBTDP | 1 | |
| 3. 0.1% DLTDP | 1 | |
| 4. 1.0% DLTDP | 5 | |
| 5. 0.1% DSTDP | 1 | |
| 6. 0.1% 4,4′-Ethylenedioxybis (2-5-butylphenol) | 40 | 150 |
| 7. 0.1% 4,4′-Ethylenedioxybis (2-t-octylphenol) | 40 | |
| 8. 0.1% 4,4′-Decamethylenedioxybis (2-t-butylphenol) | 50 | |
| 9. 0.1% 4,4′-Ethylenedioxybis (2-t-butylphenol) + 0.1% DBTDP | 150 | |
| 10. 0.1% 4,4′-Ethylenedioxybis (2-t-butylphenol) + 0.1% DLTDP | 270 | 700 |
| 11. 0.1% 4,4′-Ethylenedioxybis (2-t-butylphenol) + 0.1% DSTDP | 290 | |
| 12. 0.1% 4,4′-Ethylenedioxybis (2-t-octylphenol) + 0.1% DLTDP | 280 | |
| 13. 0.1% 4,4′-Decamethylenedioxybis (2-t-butylphenol) + 0.1% DLTDP | 290 | |
| 14. 0.1% 2-t-Butyl-4-methoxyphenol + 0.1% DLTDP | 30 | 270 |
| 15. 0.2% 2-t-Butyl-4-methoxyphenol + 0.1% DLTDP | 50 | |
| 16. 0.1% 2-t-Butyl-4-butoxyphenol + 0.1% DLTDP | 45 | 300 |

As can be observed from the data set out in Table A above, combinations of dialkyl-3,3′-thiodipropionates and various alkylenedioxybis (alkylated phenols) are synergistic combinations, the stabilizing effect of such combinations being substantially more than the additive stabilizing effect of the components of such combinations.

The surprising and unexpected nature of this discovery can also be readily seen from these data, which show that other phenolic compounds do not exhibit such a surprising synergistic effect when used with dialkyl-3,3′-thiodipropionates.

Similar synergism has been demonstrated when other alkylenedioxybis(alkylated phenols) within the formula set out above are used, or when solid plastic grade polyethylene having an average molecular weight greater than 15,000, a density of about 0.91, and a melt index of about 7.59 is substituted for the polypropylene.

EXAMPLE 2

Representative dialkyl-3,3'-thiodipropionates and alkylenedioxybis(alkylated)phenols in combination were evaluated by the method used above in the stabilization of plastic grade solid polyethylene having an average molecular weight greater than 15,000, a density of about 0.91, and a melt index of about 7.59. The results of the stability test are summarized by the data set out in Table B below. The concentrations of additive in Table B are based on the weight of the polyethylene. In Table B the abbreviations have the same meaning as those in Table A.

*Table B*

| Additives in Polyethylene | Oven Life In Hours— Aged at 140° C. |
|---|---|
| None | 13 |
| 0.025% 4,4'-Ethylenedioxybis (2-t-butylphenol) | 18 |
| 0.050% 4,4'-Ethylenedioxybis (2-t-butylphenol) | 20 |
| 0.025% 4,4'-Decamethylenedioxybis (2-t-butylphenol) | 20 |
| 0.050% 4,4'-Decamethylenedioxybis (2-t-butylphenol) | 23 |
| 0.025% DLTDP | 100 |
| 0.025% DSTDP | 110 |
| 0.025% 4,4'-Ethylenedioxybis (2-t-butylphenol)+0.025% DLTDP | >140 |
| 0.025% 4,4'-Ethylenedioxybis (2-t-butylphenol)+0.025% DSTDP | >140 |
| 0.025% 4,4'-Decamethylenedioxybis (2-t-butylphenol)+ 0.025% DLTDP | >140 |

A similar stabilizing effect as that demonstrated by the data set out in Table B is also demonstrated if other combinations of alkylenedioxybis(alkylated phenols) and alkyl-3,3'-thiodipropionates as described above are substituted for those of Table B.

The present invention thus provides novel poly-α-olefin compositions having enhanced stability against deterioration resulting from exposure to elevated temperatures, and particularly, it provides novel synergistic stabilizer combinations for poly-α-olefin compositions.

Although the invention has been described in detail with reference to preferred embodiments thereof, it will be understood that variations and modifications can be effected within the spirit and scope of the invention as described hereinabove and as defined by the appended claims.

We claim:
1. A solid poly-α-olefin composition comprising a solid poly-α-olefin of an α-monoolefinic aliphatic hydrocarbon having 2 to 10 carbon atoms and a stabilizer combination comprising at least about 0.0005% by weight based on said poly-α-olefin of a diester of 3,3'-thiodipropionic acid having the formula:

wherein R is an alkyl radical having at least 4 carbon atoms, and at least about 0.0005% by weight based on said poly-α-olefin of an alkylenedioxybis(alkylated phenol) having the formula

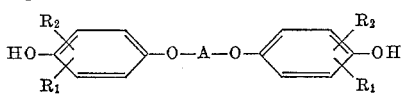

wherein each of $R_1$ and $R_2$ represents a member selected from the group consisting of a hydrogen atom and an alkyl organic radical containing from 1 to 18 carbon atoms and A represents an alkylene radical containing from 2 to 20 carbon atoms.

2. A solid poly-α-olefin composition as defined by claim 1 wherein the diester of 3,3'-thiodipropionic acid is dilauryl-3,3'-thiodipropionate and the alkylenedioxybis (alkylated phenol) is 4,4'-ethylenedioxybis(2-t-butylphenol).

3. A solid poly-α-olefin composition as defined by claim 1 wherein the diester of 3,3'-thiodipropionic acid is dibutyl-3,3'-thiodipropionate and the alkylenedioxybis (alkylated phenol) is 4,4'-ethylenedioxybis(2-t-butylphenol).

4. A solid poly-α-olefin composition as defined by claim 1 wherein the diester of 3,3'-thiodipropionic acid is dilauryl-3,3'-thiodipropionate and the alkylenedioxybis (alkylated phenol) is 4,4'-ethylenedioxybis(2-t-octylphenol).

5. A solid poly-α-olefin composition as defined by claim 1 wherein the diester of 3,3'-thiodipropionic acid is dilauryl-3,3'-thiodipropionate and the alkylenedioxybis (alkylated phenol) is 4,4'-decamethylenedioxybis(2-t-butylphenol).

6. A solid poly-α-olefin composition as defined by claim 1 wherein the diester of 3,3'-thiodipropionic acid is distearyl-3,3'-thiodipropionate and the alkylenedioxybis (alkylated phenol) is 4,4'-ethylenedioxybis(2-t-butylphenol).

7. A solid poly-α-olefin composition comprising a solid poly-α-olefin selected from the group consisting of polyethylene and polypropylene containing a stabilizer combination comprising about 0.0005% to 5% by weight based on said poly-α-olefin of a stabilizer combination comprising a diester of 3,3'-thiodipropionic acid having the formula

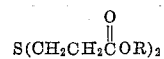

wherein R is an alkyl radical having 4 to 20 carbon atoms, and about .0005% to 5% by weight based on said poly-α-olefin of an alkylenedioxybis(alkylated phenol) having the formula

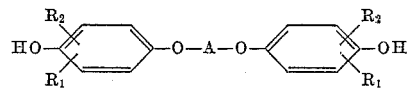

wherein each of $R_1$ and $R_2$ represents a member selected from the group consisting of a hydrogen atom and an alkyl organic radical containing from 1 to 18 carbon atoms, and A represents an alkylene radical containing from 2 to 20 carbon atoms.

8. A solid poly-α-olefin composition comprising solid polyethylene containing a stabilizer combination comprising about 0.0005% to 5% by weight based on said polyethylene of a diester of 3,3'-thiodipropionic acid having the formula

wherein R is an alkyl radical having 4 to 20 carbon atoms, and about .0005% to 5% by weight based on said polyethylene of an alkylenedioxybis (alkylated phenol) having the formula

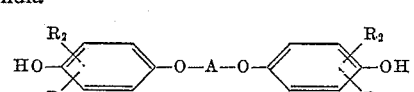

wherein each of $R_1$ and $R_2$ represents a member selected from the group consisting of a hydrogen atom and an alkyl organic radical containing from 1 to 18 carbon atoms and A represents an alkylene radical containing from 2 to 20 carbon atoms.

9. A solid poly-α-olefin composition comprising solid polypropylene containing a stabilizer combination comprising about 0.0005% to 5% by weight based on said polypropylene of a diester of 3,3'-thiodipropionic acid having the formula

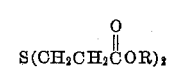

wherein R is an alkyl radical having 4 to 20 carbon atoms, and about 0.0005% to 5% by weight based on said polypropylene of an alkylenedioxybis (alkylated phenol) having the formula

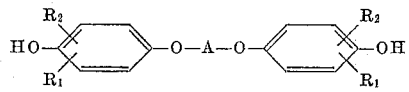

wherein each of $R_1$ and $R_2$ represents a member selected from the group consisting of a hydrogen atom and an alkyl organic radical containing from 1 to 18 carbon atoms and A represents an alkylene radical containing from 2 to 20 carbon atoms.

10. Food packaging materials having the composition defined by claim 1 whereby the storage life is enhanced for foods containing fats and fatty oils as compared to said packaging materials containing none of said stabilizer combination.

11. A process for the preparation of polypropylene shaped articles stabilized against thermal degradation which comprises dry blending in powdered polypropylene about 0.1% by weight of said polypropylene of dilauryl-3,3'-thiodipropionate and about 0.1% by weight of said polypropylene of 4,4'-decamethylene dioxybis-(2-t-butylphenol) and compression molding said polypropylene containing said dilauryl-3,3'-thiodipropionate and said 4,4'-decamethylenedioxybis(2-t-butylphenol) into shaped articles having an oven life at about 160° C. of at least about 140 hours.

12. A method for the preparation of poly-α-olefin shaped articles stabilized against thermal degradation which comprises mixing by dry blending in a powdered poly-α-olefin from about 0.0005% to about 5% by weight based on the weight of said poly-α-olefin of a diester of 3,3'-thiodipropionic acid having the formula.

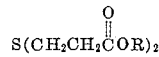

wherein R is an alkyl radical having at least 4 carbon atoms and from about 0.0005% to about 5% by weight based on the weight of said poly-α-olefin of an alkylenedioxybis (alkylated phenol) having the formula

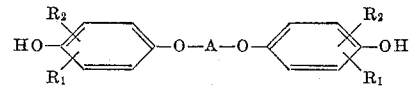

wherein each of $R_1$ and $R_2$ represents a member selected from the group consisting of a hydrogen atom and an alkyl organic radical containing from 1 to 18 carbon atoms and A represents an alkylene radical containing from 2 to 20 carbon atoms and compression molding the composition formed by said mixing by dry blending into shaped articles having an oven life at about 160° C. of at least about 140 hours.

References Cited in the file of this patent
UNITED STATES PATENTS

| | | |
|---|---|---|
| 2,972,597 | Newland et al. | Feb. 21, 1961 |
| 2,976,260 | Newland et al. | Mar. 21, 1961 |